United States Patent [19]

Harrison

[11] Patent Number: 4,640,431
[45] Date of Patent: Feb. 3, 1987

[54] DUAL-CHAMBERED OIL CHANGING CONTAINER

[76] Inventor: Robert W. Harrison, 3475 Joan Drive, Mississauga, Ontario, Canada, L5B 1T7

[21] Appl. No.: 751,687

[22] Filed: Jul. 3, 1985

[51] Int. Cl.⁴ .............................................. B65D 85/00
[52] U.S. Cl. ................... 220/1 C; 220/23.83; 220/DIG. 6; 206/223; 184/106
[58] Field of Search ............... 220/23.83, 1 C, DIG. 6, 220/20; 206/223; 184/106

[56] References Cited

U.S. PATENT DOCUMENTS

| | | |
|---|---|---|
| 1,568,830 | 1/1926 | Gunderson . |
| 1,951,498 | 3/1934 | Whitney . |
| 4,098,398 | 7/1978 | Meyers . |
| 4,296,838 | 10/1981 | Cohen . |
| 4,403,692 | 9/1983 | Pollacco . |
| 4,488,584 | 12/1984 | Hestehart et al. ................... 206/223 |
| 4,524,866 | 6/1985 | Pollacco ....................... 220/DIG. 6 |

*Primary Examiner*—Joseph Man-Fu Moy
*Attorney, Agent, or Firm*—Harness, Dickey & Pierce

[57] ABSTRACT

There is disclosed a dual-chambered container suited for use in changing the engine oil of a motor vehicle. The container comprises two chambers, one for receiving the used engine oil as it is drained from the motor vehicle and another chamber that contains new oil for replenishing the engine's oil reservoir with fresh oil. The two chambers are independent yet integrally bonded together to form the unique container. Each chamber has its own opening and closure means for receiving, transporting, and dispensing the engine oil.

14 Claims, 9 Drawing Figures

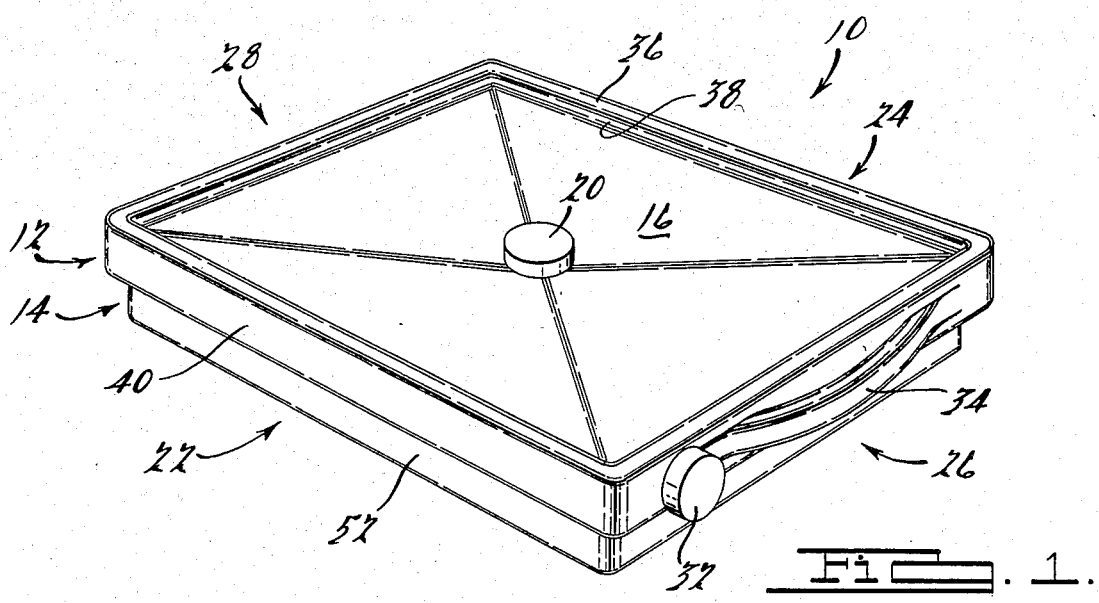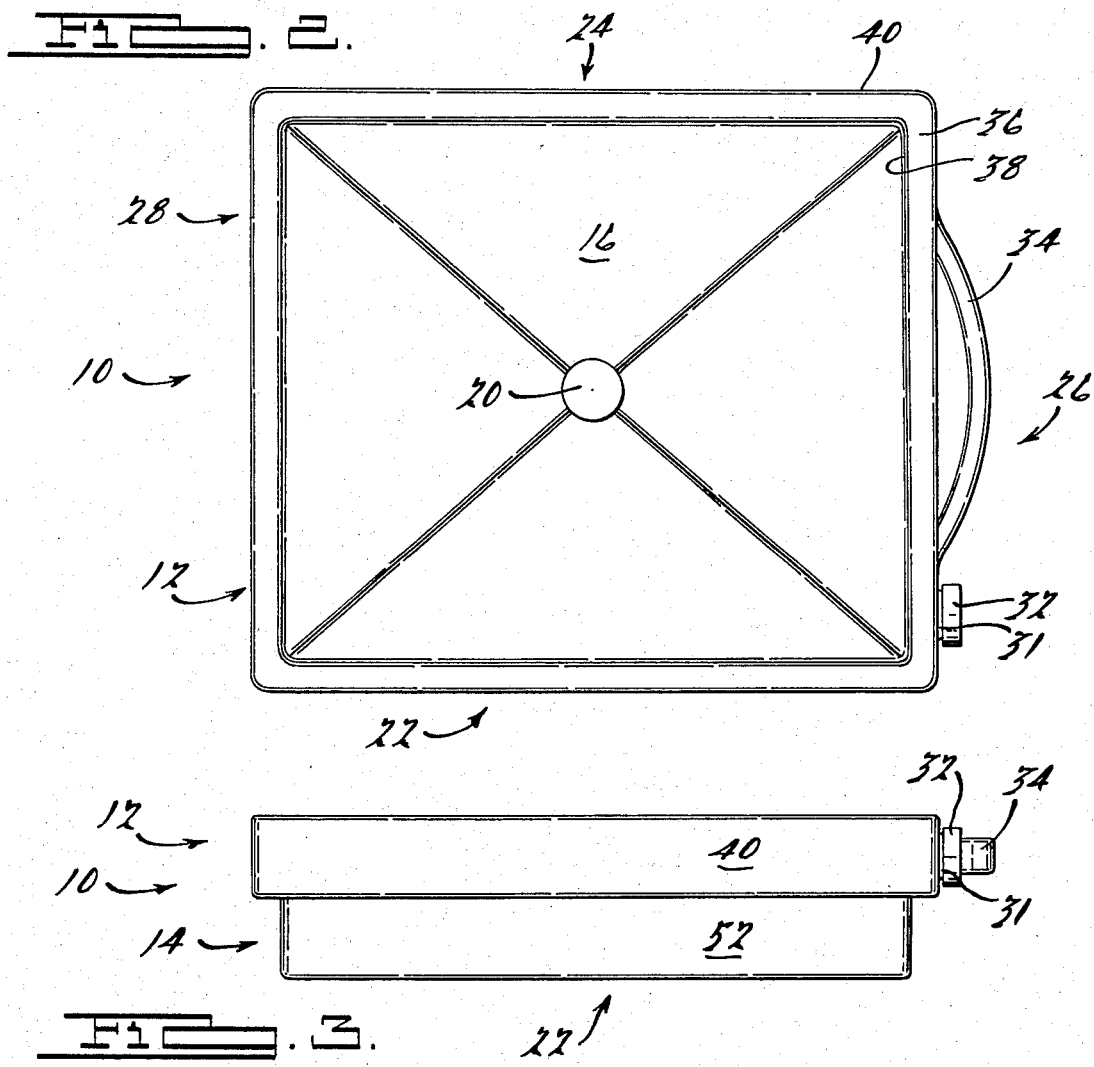

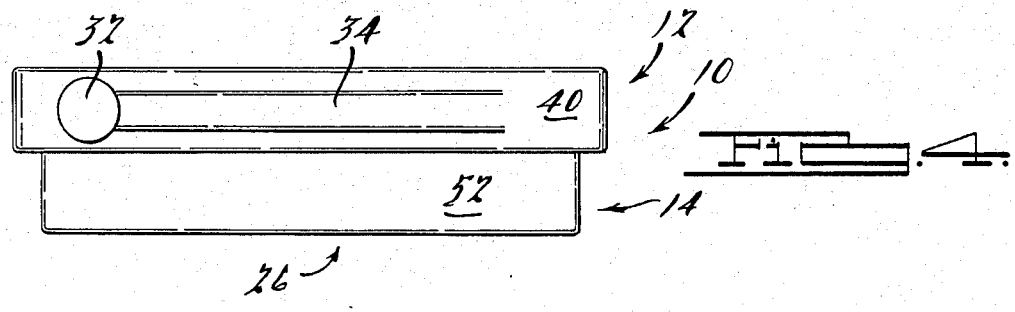
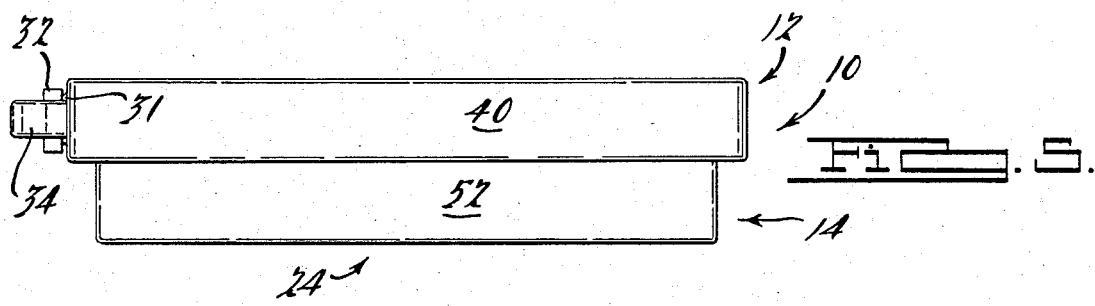
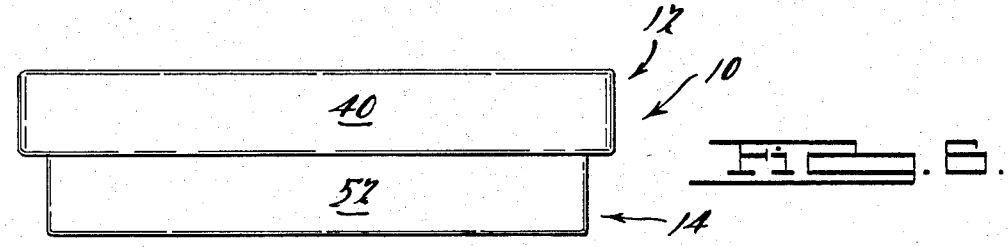
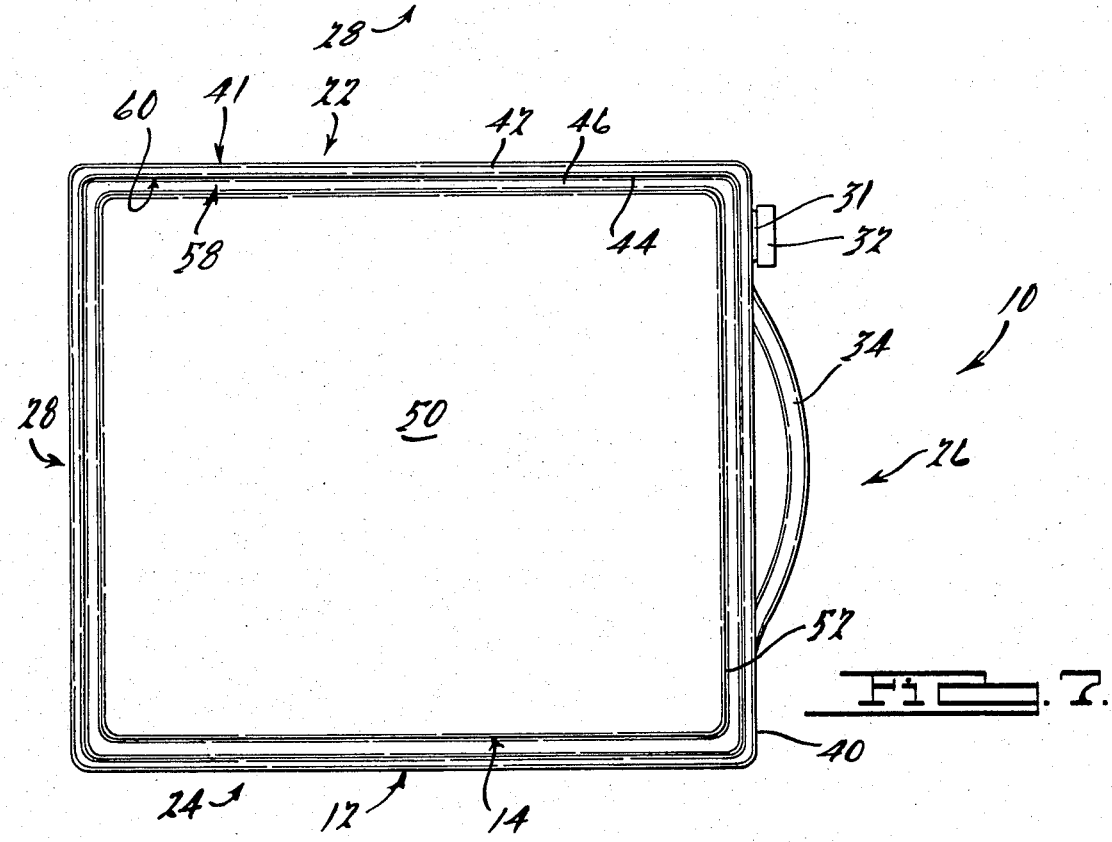

DUAL-CHAMBERED OIL CHANGING CONTAINER

BACKGROUND AND SUMMARY OF THE INVENTION

This invention relates to a dual-chambered container for facilitating changing the engine oil of a motor vehicle. The dual-chambered container is particularly adapted for receiving used and worn out engine oil in one chamber while new or replacement engine oil for replenishing the motor vehicle's oil reservoir is contained in the other chamber.

In the present age of conservation and concern about natural resources, there is an increasing need and desire to recycle products. One of these products is oil which has gained much attention with recent past and predicted future shortages. It is well known that oil, like many other natural resources, is in fixed supply. Oil, however, is a necessary lubricant for automotive internal combustion engines. Manufacturers of the automotive vehicles recommend that the engine oil be changed at regular intervals, usually every several thousand miles. This process of removing the old engine oil and replacing it with fresh oil is usually accomplished in one of two ways. The vehicle owner may take the vehicle to a service station and pay someone to change the oil, or he may elect to change the oil himself as it is designed to be a relatively simple task. More and more people are opting for the latter approach in our increasingly do-it-yourself society.

There are drawbacks, however, to the motor vehicle owner changing his own oil. First of all, it can be a messy task and secondly, the problem arises of what to do with the used oil once it is removed from the vehicle. In urban areas, where the biggest concentration of automotive vehicles exists, the vast majority of used engine oil removed by do-it-yourselfers is either emptied into sewers where it fouls up sewage treatment plants or flows into lakes where it pollutes the environment, or it is placed in municipal garbage. After the garbage is deposited, the oil can drain out, eventually seep through the ground into the water table, and contaminate drinking water supplies.

Besides having a negative effect on the environment, this discarding of used oil translates into the loss of a considerable amount of reusable oil from the potential supply. Service stations often collect their own used oil to be re-refined by a third party into a usable product. Service stations will even offer to receive used oil from do-it-yourselfers for such recycling. However, such offers have largely proved to be inconvenient to the service station who must have adequate facilities for the receipt of such used oil as well as inconvenient for the do-it-yourselfer.

The biggest inconvenience to the do-it-yourselfer is the extra steps of finding a suitable container in which to transport the used oil to a collection facility, and how to transfer the used oil from the pan which collects the oil from the vehicle to the container for transport to the collection facility.

This problem of used motor oil disposal is not new. Various attempts to solve this problem have been made, all of which have proved unsuccessful. For instance, U.S. Pat. No. 4,296,838 to Cohen discloses a system of changing motor oil that encompasses two separate containers that require separate handles, a means for fastening the containers together when transporting, and a pair of hinge clips for pivoting the separate containers when collecting used oil. The configuration of the Cohen system containers results in unused space in the used oil container when it is filled and therefore requires that the containers be separated when draining the used oil from the vehicle into the used oil container. Without separating the containers, the Cohen system would simply be too tall for sliding under a vehicle unless the vehicle was raised up in the air.

U.S. Pat. No. 4,403,692 to Pollacco also discloses a motor oil changing kit. This kit, too, is unsatisfactory because it involves separate containers, one which fits inside the other, that must be removed from each other when used. Furthermore, when transporting used oil to a collection facility, each of the Pollacco containers must be either transported separately or the used oil must be repoured into the new oil container thus requiring an extra step.

It is, therefore, an object of this invention to overcome the inadequacies of the prior art by providing a dual-chambered oil changing container that is one-piece, compact, and easy to use thus encouraging the do-it-yourselfer to bring the used oil to a collection center instead of discarding it in a potentially polluting manner.

A further object of this invention is to provide a dual-chambered oil changing container design that eliminates the requirement of separating the containers and eliminates extra components required to hinge or fasten separate containers together.

It is a further object of the invention to provide a one-piece oil changing container design that eliminates the need to repour the used oil once it is drained from the vehicle.

A still further object of the present invention is to provide a dual-chambered oil changing container in which the configuration of the new oil chamber performs the function of funnelling the used oil into the used oil chamber.

It is a still further object of the present invention to provide a compact design for a one-piece dual-chambered oil changing container so that there is no wasted space between the top of the funnelling surface and the bottom of the funnelling surface as in prior art devices like Cohen.

Additional objects and features of the present invention will become apparent from the subsequent description and appended claims taken in conjunction with the accompanying drawings.

BRIEF DESCRIPTION OF THE DRAWINGS

FIG. 1 is a perspective view of the duel-chambered oil changing container embodying the present invention.

FIG. 2 is a top plan view of the dual-chambered oil changing container.

FIG. 3 is a elevation view of the left side of the dual-chambered oil changing container.

FIGS. 4 and 6 are front and rear elevation views, respectively, of the dual-chambered oil changing container.

FIG. 5 is an elevation view of the right side of the dual chambered oil changing container.

FIG. 7 is a plan view looking upward from underneath the dual-chambered oil changing container.

DETAILED DESCRIPTION OF THE PREFERRED EMBODIMENT

Figure 8:
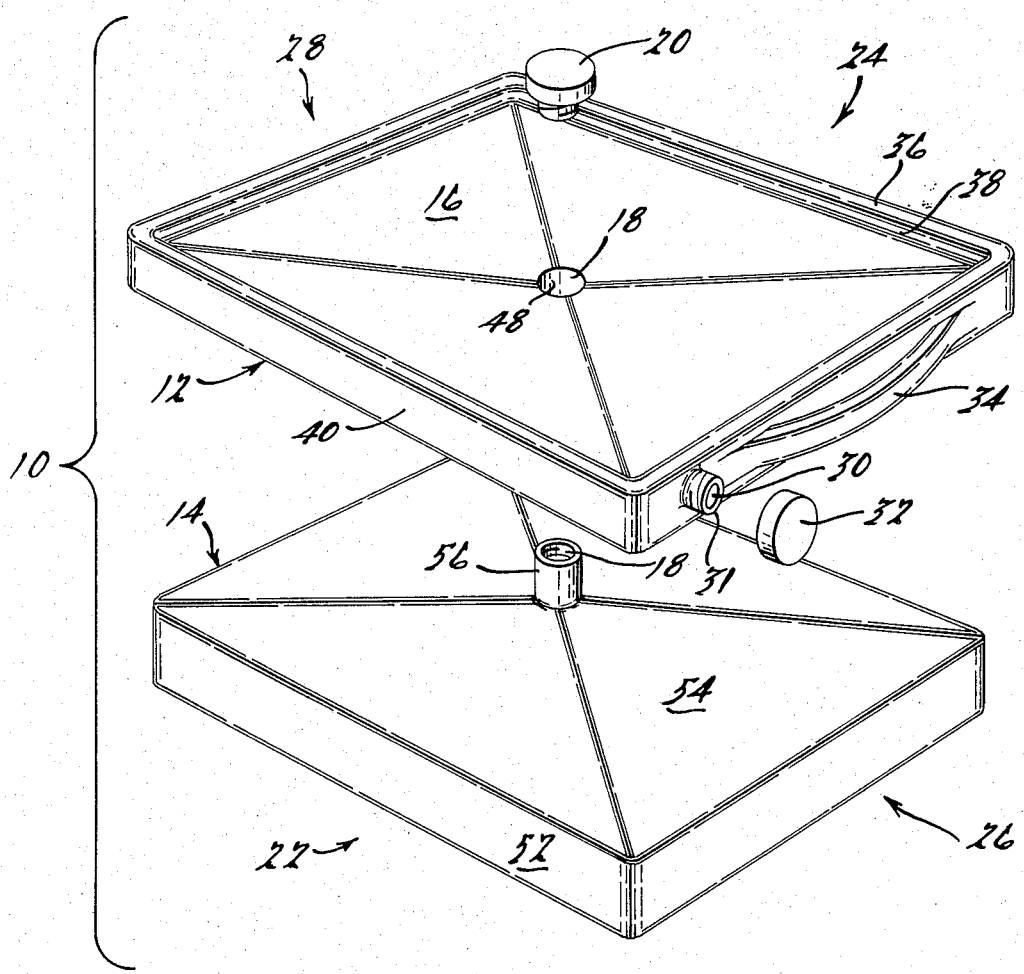
FIG. 8 is an exploded perspective view showing the new and old oil chambers that combine to form the dual-chambered oil changing container of the present invention.

Referring now to the drawings, a dual-chambered oil changing container in accordance with the present invention is shown in FIG. 1 at 10. The dual-chambered oil changing container 10 (hereinafter "container 10") includes a new oil chamber 12 and a used oil chamber 14. As shown in FIGS. 1 and 2, new oil chamber 12 has an upper funnel surface 16 that slopes downwardly from the perimeter of new oil chamber 12 in a converging manner to a used oil inlet 18 at the lowest point of funnel surface 16. Used oil inlet 18 is fitted with a removable plug 20 that prevents the used oil from spilling out of used oil chamber 14 when the new oil is poured from new oil chamber 12 into a vehicle or when container 10 is otherwise being handled or transported.

As shown in FIGS. 3 through 6, container 10 has a left side 22, a right side 24, a front 26, and a back 28. New oil chamber 12 has a new oil opening 30 on front 26 for receiving and dispensing new oil. Opening 30 has a lip 31 which protrudes outwardly from front 26 and serves as a spout for dispensing the new oil from new oil chamber 12. Lip 31 is configured to accommodate a removable closure means for sealing new oil chamber 12 while container 10 is receiving used oil or in transport. One embodiment of the closure means is a threaded female cap 32 that sealingly engages corresponding threads on the outside of lip 31. Due to the difference in configuration of cap 32 and plug 20, even if opening 30 and used oil inlet 18 are correspondingly sized, interchange of cap 32 and plug 20 and potential contamination of the new oil is prevented.

Container 10 has a handle 34, shown in FIGS. 1 through 5, that is integral with front 26 of container 10. Handle 34 assists the vehicle owner in transporting container 10 and placing the container underneath a motor vehicle's oil pan for draining used engine oil. Handle 34 further protects lip 31 and cap 32 from damage during handling and transport of the container. Container 10 is preferrably molded from a suitable plastic material with handle 34 being simultaneously molded therein. The placement of handle 34 allows container 10 to be picked up, set down, and carried like a small suitcase.

Figure 9:
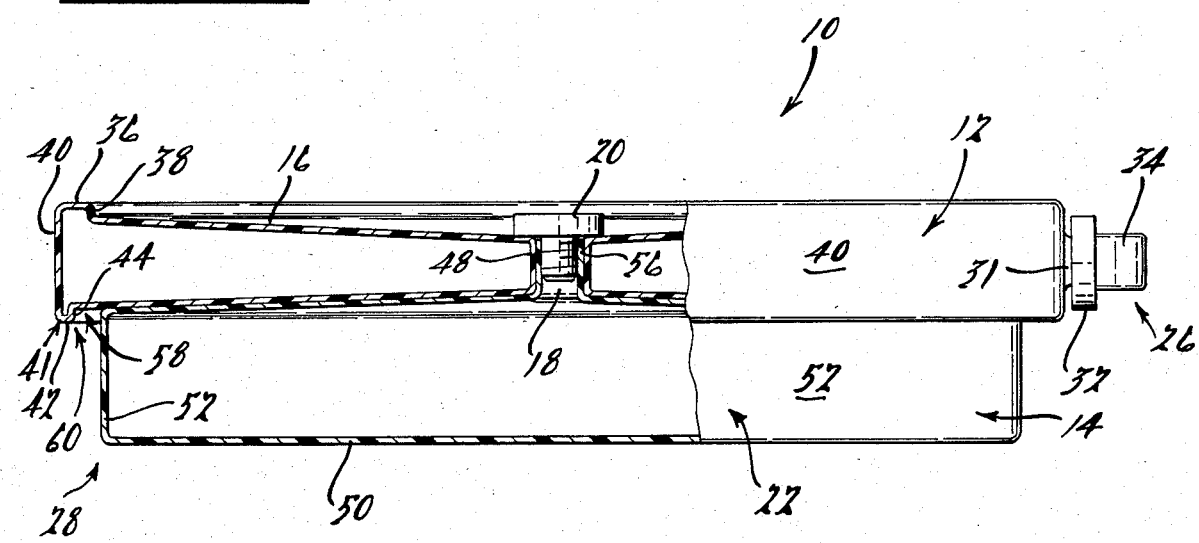
FIG. 9 is a left side elevation view, partially broken away, of the dual-chambered oil changing container.

New oil chamber 12, used oil chamber 14, used oil plug 20, and new oil plug 32 are shown in exploded perspective view in FIG. 8, and in FIG. 9 left side 22 of container 10 is shown partially broken away in elevational view. From the broke away view it can be seen that new oil chamber 12 has an upper side wall or edge 40 that extends vertically and defines the outer boundary of chamber 12. From the top of edge 40 a planer perimeter section 36 of new oil chamber 12 extends inwardly. Extending downwardly from planer section 36 is a connecting portion 38 that connects the inner edge of planer section 36 and the outer periphery of funnel surface 16. Connecting portion 38 and planer section 36 form a recess in new oil chamber 12 which serves in part to prevent used oil from overflowing funnel surface 16 of container 10 when receiving used oil from a vehicle's engine.

Edge 40 of new oil chamber 12 extends downwardly from the outward end of planer section 36 and at the bottom of edge 40 is a ridge 41 that is comprised of a horizontal portion 42 that extends inwardly from the bottom of edge 40 and a riser 44 that extends upwardly from the inward end of horizontal portion 42. The upper end of riser 44 is connected to a lower surface 46 of new oil chamber 12. Lower surface 46 converges inwardly from riser 44 at a slight upward angle to a centrally located cylindrical extension or sleeve 48 that connects funnel surface 16 and lower surface 46 to accommodate used oil inlet 18.

As shown in FIGS. 8 and 9, used oil chamber 14 is comprised of a base 50, one or more lateral walls 52, a top 54, and a neck 56. Top 54 of used oil chamber 14 converge inwardly from walls 52 at a slight upward angle substantially equivalent to the slope of lower surface 46 of new oil chamber 12. Top 54 converges to neck 56 which is configured to fit through sleeve 48 when new oil chamber 12 and used oil chamber 14 are joined together. The length of neck 56 is such that it will be flush with funnel surface 16 and form used oil inlet 18 when the chambers are joined to receive the used engine oil. In this manner all of the used oil will pass through used oil inlet 18 without creating a pool of oil at the bottom of funnel surface 16 which would require removal prior to further use of container 10.

The configuration of new oil chamber 12, then, aims the used oil into used oil chamber 14. The used oil enters and is subsequently drained from used oil chamber 14 by way of used oil inlet 18. The slight upward slope of top 54 as it converges toward neck 56 facilitates draining used oil chamber 14 at the service center.

As shown in FIGS. 7 and 9, new and used oil chambers 12 and 14 are similar in shape and have outer dimensions such that the perimeter of used oil chamber 14 is slightly less than the perimeter defined by connecting portion 30. This difference in dimension creates an overhang 58 around the perimeter between new oil container chamber 12 and used oil chamber 14 when the two chambers are assembled together. Overhang 58 includes a grip portion 60 that is formed by horizontal portion 42, riser 44, and the portion of lower surface 46 that is adjacent to riser 44. Grip portion 60 assists the do-it-yourselfer in sliding or positioning container 10 from any direction when placing or removing container 10 underneath a vehicle. Overhand 58 and grip portion 60 also assist in picking up container 10 when it is laying flat.

The relative difference in outside dimensions and configuration of new and used oil chambers 12 and 14 also permits containers 10 to be stacked upon each other. When containers 10 are stacked, bottom surface 46 of used oil chamber 14 of one container 10 rests on and is supported by the outer portion of funnel surface 16 within the confines of planer section 36 and connecting portion 38 of new oil chamber 12 of another container 10. Plug 20 is situated so that it also supports the central portion of bottom surface 46 of used oil chamber 14 when containers 10 are stacked.

Container 10 may be of square, rectangular, or any other suitable configuration that retains its low profile which enables container 10 to be slid underneath a motor vehicle's oil pan without raising the vehicle. The overall size of container 10 is such that sufficient capacity exists in new and used oil chambers 12 and 14 to hold the volume of used oil to be drained from an automotive vehicle as well as the volume of new oil necessary to refill the engine's oil reservoir. With respect to today's automobiles that overall capacity is approximately six to ten quarts.

Container 10 may be constructed of any suitable material including plastic resin or the like. If a plastic is used, new and used oil chambers can be economically produced using conventional injection or blow molding techniques. As shown in FIGS. 1 through 9 the corners of chambers 12 and 14 are radiused to add strength to the container and to facilitate removal from the manufacturing mold or molds.

New and used oil chambers 12 and 14 are bonded together in conventional methods of bonding plastic pieces. In this manner a container 10 is provided that comprises two individual chambers divided by a double thickness of plastic for extra strength and stability.

Container 10 provides a unique system of encouraging the conservation and recycling of used engine oil. Pollution of the environment will be reduced because the financial incentive for do-it-yourselfers will now greatly outweigh the diminished inconvenience of collecting used oil for return and recycling. Since the reusabble containers 10 must be returned to the service center anyway, the pouring of used oil down drains and the like will be discouraged. Additionally, pollution will be reduced because the demand for conventional metal or plastic new oil containers that are discarded after a single use will be greatly diminished.

Thus, there is described and shown in the above description, background, and drawings a dual-chambered oil changing container which fully and effectively accomplishes the objectives thereof. However, it will be apparent that variations and modifications of the disclosed embodiment may be made without departing from the principles of the invention or the scope of the appended claims.

It is claimed:

1. A dual-chambered oil changing container comprising:
   (a) a new oil chamber having a generally flat configuration defined by upper and lower broad, spaced surfaces, said upper surface having a shallow recess and a converging downward slope to a used oil inlet; and
   (b) a used oil chamber situated beneath said new oil chamber, said used oil chamber having a generally flat configuration defined by a broad, spaced top and base, said top having a cylindrical extension that extends from said top through said lower surface of said new oil chamber and is integrally connected to said used oil inlet.

2. A dual-chambered oil changing container as described in claim 1 further comprising a new oil opening located on the front of said new oil chamber and a removable closure means for sealing said opening.

3. A dual-chambered oil changing container, as described in claim 2, wherein said closure means is a female cap.

4. A dual-chambered oil changing container, as described in claim 3, further comprising an integral handle formed on the front of said new oil chamber containing said new oil opening.

5. A dual-chambered oil changing container, as described in claim 1, wherein said inlet is configured to accommodate a removable plug for sealing said used oil chamber.

6. A dual-chambered oil changing container as described in claim 1, wherein the capacities of said new oil chamber and said used oil chamber are substantially equal.

7. A dual-chambered oil changing container, as described in claim 1, wherein said used oil chamber is of sufficient capacity to hold the volume of used oil contained in a motor vehicle engine oil reservoir and said new oil chamber is of sufficient capacity of hold the volume of new oil necessary to refill said reservoir.

8. A dual-chambered oil changing container, as described in claim 7, wherein the capacity of said new oil chamber is approximately three to five quarts and the capacity of said used oil chamber is approximately three to five quarts.

9. A dual-chambered oil changing container, as described in claim 1, wherein said new oil chamber overhangs the perimeter of said used oil chamber thereby providing a grip portion surrounding said container to assist positioning said container underneath a vehicle for collecting used oil.

10. A dual-chambered oil changing container, as described in claim 1, wherein said new and used oil chambers are separated horizontally by a double wall thickness.

11. A dual-chambered oil changing container, as described in claim 1, wherein said upper surface of new oil chamber is configured with a planar section extending inwardly from the outer perimeter of said new oil chamber, and a connecting portion extending downward between the inward end of said planar section and the beginning of said downwardly sloping funnel-like upper surface, whereby the perimeter defined by said connecting portion is slightly larger than the periphery of said used oil chamber and said dual-chambered oil changing containers are thereby stackable in a resting relationship with said base of said used oil chamber of one container resting on the outer portion of said funnel-like upper surface of another container within the confines of said planar section and said connecting portion of said other container.

12. A dual-chambered oil changing container, as described in claim 1, wherein said top of said used oil chamber slopes slightly upwardly from the perimeter of said used oil chamber to said cylindrical extension.

13. A dual-chambered oil changing container comprising:
   (a) a new oil chamber having a generally flat configuration defined by upper and lower broad, spaced surfaces and one or more upper side walls to enclose said new oil chamber, said upper surfaces having a broad shallow recess that slopes downwardly to a used oil inlet that is fitted with a removable plug;
   (b) a used oil chamber situated beneath said new oil chamber, said used oil chamber having a configuration generally similar to that of said new oil chamber and a broad, spaced top and base, and one or more lateral walls that extend between said top and base to enclose said used oil chamber, said top having a cylindrical extension that passes through said new oil chamber to said used oil inlet;
   (c) a new oil opening located on said upper side wall of said new oil chamber and a closure means for removably sealing said opening; and
   (d) a handle integral with said upper side wall of said new oil chamber.

14. A dual-chambered oil changing container, as described in claim 13, wherein said new oil chamber and said used oil chamber are separate chambers bonded together to form said container.

* * * * *